(12) United States Patent
Enokishima

(10) Patent No.: US 9,726,964 B2
(45) Date of Patent: Aug. 8, 2017

(54) PROJECTOR

(71) Applicant: Seiko Epson Corporation, Tokyo (JP)

(72) Inventor: Takanao Enokishima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/792,550

(22) Filed: Jul. 6, 2015

(65) Prior Publication Data

US 2016/0018722 A1 Jan. 21, 2016

(30) Foreign Application Priority Data

Jul. 16, 2014 (JP) ................................. 2014-145669
Jan. 22, 2015 (JP) ................................. 2015-010062

(51) Int. Cl.
*G03B 7/00* (2014.01)
*G03B 21/14* (2006.01)
*G02B 7/02* (2006.01)
*G03B 21/00* (2006.01)

(52) U.S. Cl.
CPC ........... *G03B 21/145* (2013.01); *G02B 7/028* (2013.01); *G03B 21/006* (2013.01)

(58) Field of Classification Search
CPC ...... G02B 7/00; G03B 21/145; H04N 9/3141; H04N 9/3105
USPC .......................................................... 353/97
See application file for complete search history.

(56) References Cited

U.S. PATENT DOCUMENTS

| 5,676,442 A | * | 10/1997 | Fujimori | ............... | H04N 9/3105 |
| | | | | | 353/119 |
| 6,592,226 B1 | * | 7/2003 | Fujimori | ............... | H04N 9/3105 |
| | | | | | 353/119 |
| 8,529,074 B2 | * | 9/2013 | Moriyoshi | ......... | G02B 27/1046 |
| | | | | | 353/100 |
| 2010/0265419 A1 | | 10/2010 | Hayashi et al. | | |
| 2013/0120720 A1 | * | 5/2013 | Hellin | .................... | G02B 7/021 |
| | | | | | 353/101 |

FOREIGN PATENT DOCUMENTS

JP 2010-256394 A 11/2010

\* cited by examiner

*Primary Examiner* — Steven H Whitesell Gordon
*Assistant Examiner* — Jerry Brooks
(74) *Attorney, Agent, or Firm* — ALG Intellectual Property, LLC

(57) ABSTRACT

A projector includes an image formation apparatus that forms an image, a lens barrel that accommodates a projection lens that projects the formed image, and a light blocking portion that is configured as a member separate from the lens barrel, is located in a position between the image formation apparatus and the lens barrel, and blocks light to be incident on the lens barrel. The configuration of the projector allows blockage of light incident on the lens barrel and hence prevention of distortion of the lens barrel.

3 Claims, 9 Drawing Sheets

PROJECTOR

BACKGROUND

1. Technical Field

The present invention relates to a projector.

2. Related Art

There is a known projector if related art including a light source apparatus, a plurality of liquid crystal panels that separately modulate a plurality of color light fluxes outputted from the light source apparatus, a cross dichroic prism that combines the light fluxes modulated by the plurality of liquid crystal panels to form an image, and a projection optical apparatus that enlarges and projects the formed image on a projection surface, such as a screen. As a projector of this type, there is a known configuration in which the cross dichroic prism, which has light incident surfaces to which the plurality of liquid crystal panels described above are fixed, is integrated with the projection optical apparatus by using a support member.

There is a problem with the projection optical apparatus, which has a temperature characteristic in accordance with which the focus position is slightly changed when the temperature changes. To address the problem, there is a proposed projector in which an expandable and shrinkable member is disposed between the support member that supports the prism and a holding member that holds the projection optical apparatus (see JP-A-2010-256394, for example).

In the projector described in JP-A-2010-256394, when the amount of back focus (back focal length) of the projection optical apparatus decreases due, for example, to an increase in temperature, the expandable and shrinkable member expands or shrinks to move the liquid crystal panels and the cross dichroic prism described above in a direction in which they slightly approach the projection optical apparatus. The liquid crystal panels can thus be located in the back focus position of the projection optical apparatus irrespective of any change in temperature, whereby defocus can be avoided.

A projector includes in some cases a plurality of optical parts, such as a plurality of reflection mirrors that deflect the optical path of the light outputted from a light source apparatus and a light attenuator that blocks part of light incident thereon to adjust the amount of light used for image formation. In the thus configured projector, stray light that is not used for image formation tends to be produced. The stray light is likely to enter a projection optical apparatus.

On the other hand, the projection optical apparatus is in many cases formed of an assembled lens including a plurality of lenses and a lens barrel that accommodates the plurality of lenses therein. The lens barrel is in many cases made of a synthetic resin in consideration of manufacturability and light weight.

When light is incident on the lens barrel made of a synthetic resin, the lens barrel is heated and distorted due to thermal expansion in some cases. In such cases, the positions of the projection lenses disposed in the lens barrel slightly change, undesirably resulting in defocus of a projected image.

SUMMARY

An advantage of some aspects of the invention is to provide a projector capable of preventing displacement of a projection lens.

A projector according to an aspect of the invention includes an image formation apparatus that forms an image, a lens barrel that accommodates a projection lens that projects the formed image, and a light blocking portion that is configured as a member separate from the lens barrel, is located in a position between the image formation apparatus and the lens barrel, and blocks light to be incident on the lens barrel.

The projection lens can be a plurality of lenses by way of example including a focus lens that adjusts the position where a projected image is brought into focus and a zoom lens that adjusts the viewing angle of the projected image.

According to the aspect described above, the light blocking portion, which is disposed in a position between the image formation apparatus and the lens barrel, can block light to be incident on the lens barrel from the side where the image formation apparatus is present. Therefore, even when the stray light is produced, the stray light will not enter the lens barrel.

Further, the light blocking portion is configured as a member separate from the lens barrel. Therefore, heat generated in the light blocking portion is unlikely to be transmitted to the lens barrel even light is incident on the light blocking portion and heats it.

The lens barrel is therefore not distorted due to the stray light incident thereon, whereby displacement of the projection lens described above can be suppressed. As a result, defocus of a projected image can be avoided, and the position where an image projected by the projection lens described above is not changed.

In the aspect described above, it is preferable that the projector further includes a support member that supports the image formation apparatus and the lens barrel integrally with each other, and the light blocking portion is provided as part of the support member.

According to the aspect with the configuration described above, since the light blocking portion is provided as part of the support member, the light blocking portion can be reliably configured as a member separate from the lens barrel. As a result, heat generated in the light blocking portion is reliably unlikely to be transmitted to the lens barrel. Distortion of the lens barrel and displacement of the projection lens described above can therefore be reliably suppressed.

In the aspect described above, it is preferable that the image formation apparatus includes a plurality of light modulators that each modulate a light flux incident thereon and a light combining optical apparatus that combines the light fluxes modulated by the plurality of light modulators to form the image, that the support member includes a lens barrel support member that supports the lens barrel and an apparatus support member that supports the light combining optical apparatus and is attached to the lens barrel support member, and that the light blocking portion is provided as part of the apparatus support member.

Each of the light modulators can be a liquid crystal panel byway of example. Further, the light combining optical apparatus can, for example, be a cross dichroic prism that has a plurality of light incident surfaces on which the light fluxes are incident from the plurality of light modulators and combines the light fluxes with one another in a process in which the light fluxes incident through the plurality of light incident surfaces pass through the prism.

When the light blocking portion is provided as part of the lens barrel support member, it is necessary to cause the light blocking portion to extend from the lens barrel support member toward the image formation apparatus and to be disposed in a position between the image formation apparatus and the lens barrel. In this case, the thus provided light blocking portion possibly interferes with other members, such as the light combining optical apparatus and the apparatus support member.

In contrast, in the aspect with the configuration described above, the light blocking portion described above is provided as part of the apparatus support member. The light blocking portion can therefore be readily disposed in a position between the image formation apparatus and the lens barrel without interference with the other members. Further, since the light blocking portion can be disposed in a position between the image formation apparatus and the lens barrel without any increase in the dimension therebetween, whereby any increase in the size of the projector can be avoided.

In the aspect described above, it is preferable that the light blocking portion is formed in an arcuate shape along an outer edge shape of at least part of the lens barrel when the light blocking portion is viewed from the side where the image formation apparatus is present.

According to the aspect with the configuration described above, the light blocking portion is formed in an arcuate shape along at least part of the outer edge shape of the lens barrel. The thus shaped light blocking portion does not block light to be incident on the projection lens. The light blocking portion can therefore block light to be incident on the lens barrel without blocking light to be incident on the projection lens, that is, light that forms the image.

In the aspect described above, it is preferable that the light blocking portion has an inclined surface so inclined that the inclined surface approaches a central axis of the lens barrel with distance in a direction in which the projection lens projects the image.

When the light incident on the light blocking portion is reflected off the light blocking portion and then incident on the projection lens, the light is also projected by the projection lens, possibly resulting in degradation in a projected image.

To avoid the situation described above, the light blocking portion, which has the inclined surface described above, can reflect the light incident on the inclined surface from the side where the image formation apparatus is present toward the image formation apparatus. The inclined surface can therefore prevent the light incident on the light blocking portion from being incident on or projected by the projection lens, whereby a projected image will not be degraded.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
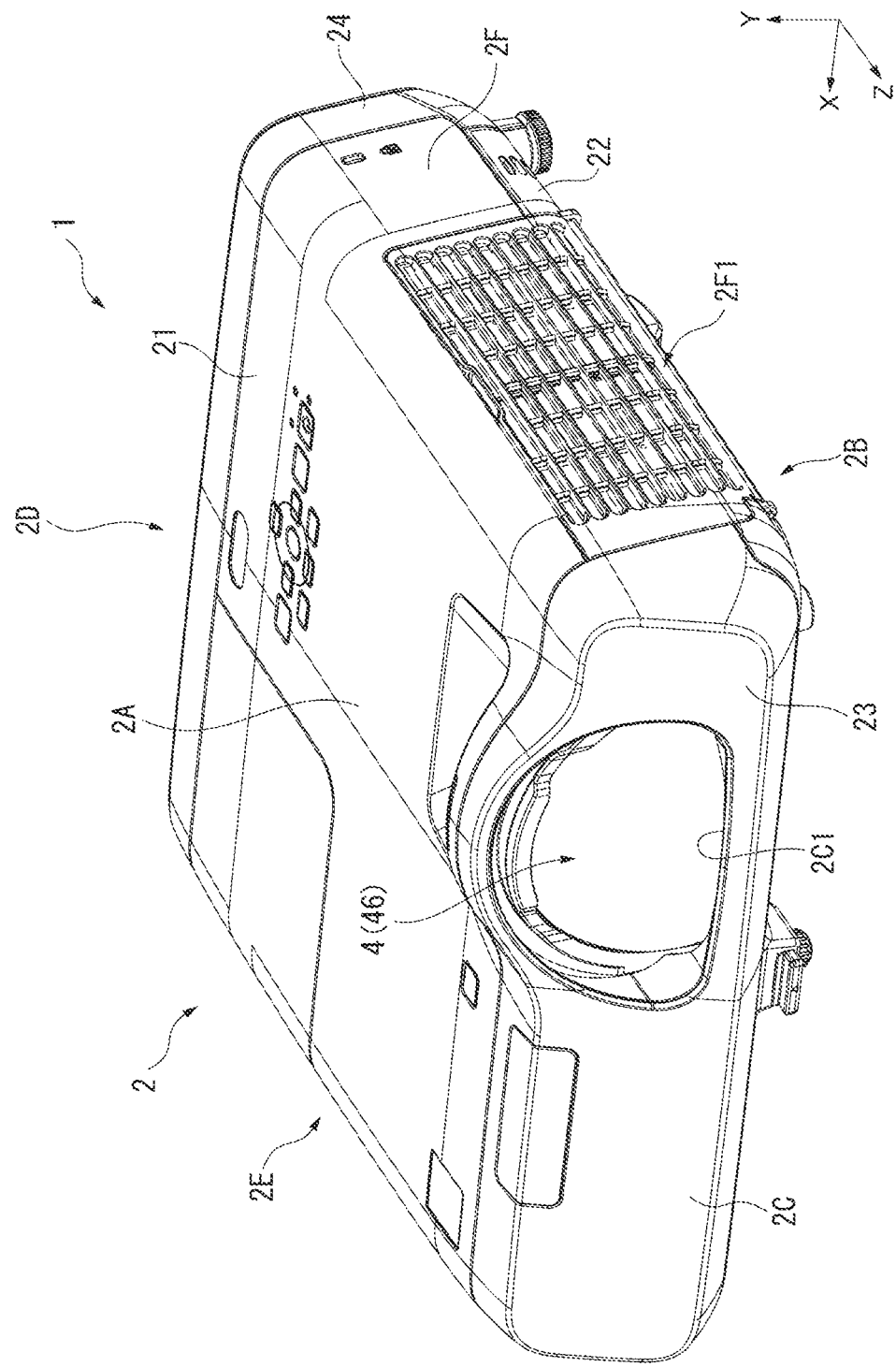
FIG. 1 is a perspective view showing the exterior appearance of a projector according to a first embodiment of the invention.

A first embodiment of the invention will be described below with reference to the drawings.
General Configuration of Projector FIG. 1 is a perspective view showing the exterior appearance of a projector 1 according to the present embodiment.

The projector 1 according to the present embodiment modulates light outputted from a light source apparatus to form an image according to image information and enlarges and projects the image on a projection surface, such as a screen. As shown in FIG. 1, the projector 1 includes an exterior enclosure 2, which forms the exterior of the projector 1, and an apparatus body 3 (see FIG. 2), which is accommodated in the exterior enclosure 2.
Configuration of Exterior Enclosure The exterior enclosure 2 has a roughly box-like shape as a whole, as shown in FIG. 1, and is made of a synthetic resin in the present embodiment. The exterior enclosure 2 has an upper case 21, a lower case 22, a front case 23, and a rear case 24, which are combined with one another to form the exterior enclosure 2.

The upper case 21 forms a top surface portion 2A and part of a left side surface portion 2E and a right side surface portion 2F of the exterior enclosure 2. The lower case 22 forms a bottom surface portion 2B and part of the left side surface portion 2E and the right side surface portion 2F of the exterior enclosure 2. The front case 23 and the rear case 24 form a front surface portion 2C and a rear surface portion 2D of the exterior enclosure 2, respectively.

The front surface portion 2C has a roughly semicircular opening 2C1 formed therein, and the opening 2C1 exposes part of a projection optical apparatus 46, which will be described later, and allows an image projected from the projection optical apparatus 46 to pass therethrough.

The right side surface portion 2F has an intake port 2F1 formed therein, and the intake port 2F1 introduces outside air into the exterior enclosure 2.

The left surface portion 2E has a discharge port (not shown) formed therein, and the discharge port discharges air having flown through the exterior enclosure 2 and cooled objects that should be cooled.
Configuration of Apparatus Body FIG. 2 is a diagrammatic view showing the configuration of the apparatus body 3.

Figure 2:
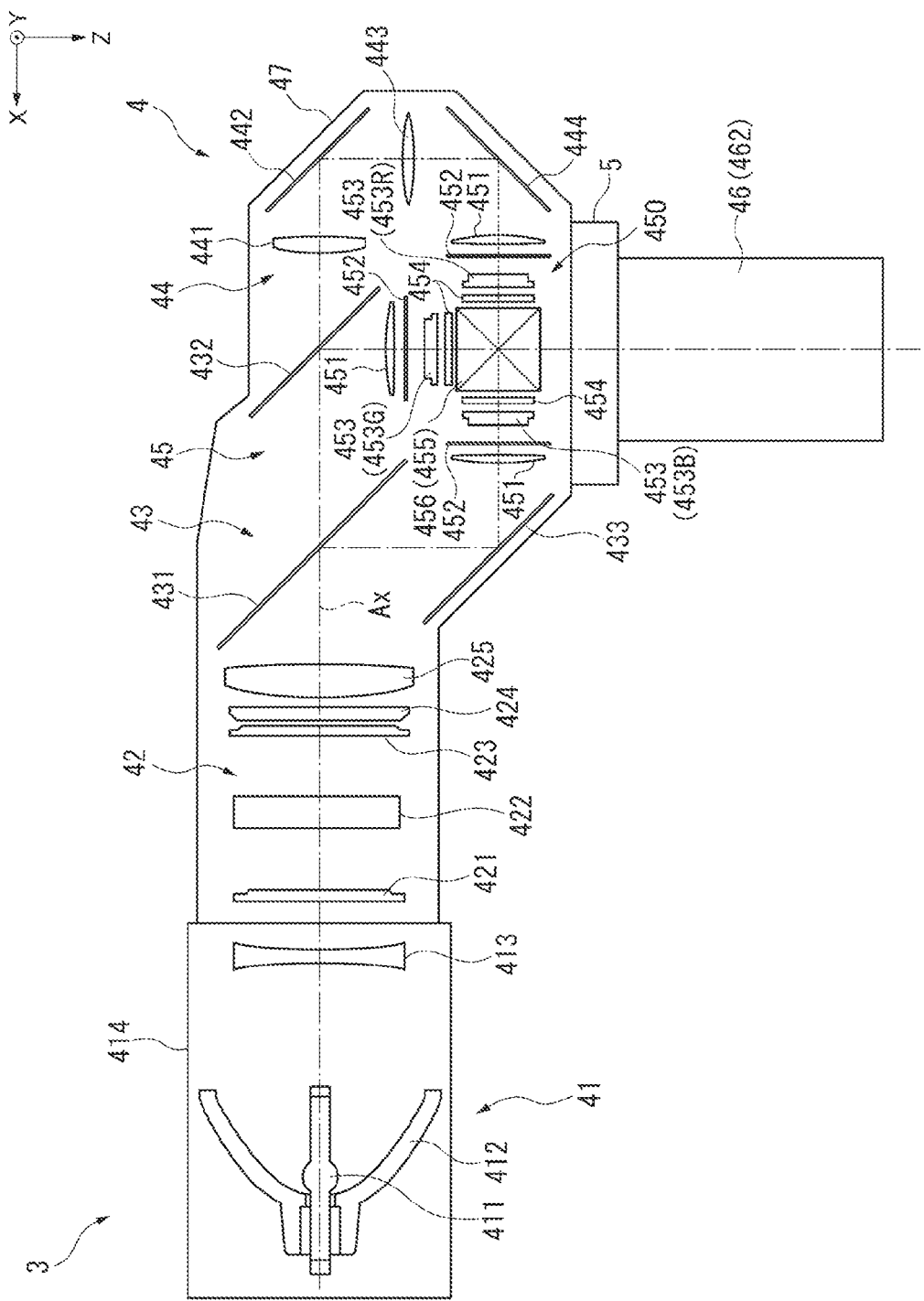
FIG. 2 is a diagrammatic view showing the configuration of an optical apparatus in the first embodiment.

The apparatus body 3 corresponds to the inner configuration of the projector 1 and includes an optical apparatus 4 and a support member 5, as shown in FIG. 2. Although not shown, the apparatus body 3 includes a controller that controls the action of the entire projector 1, a power supply that supplies electronic parts that form the projector 1 with electric power, a cooler that cools objects that form the projector 1 and are to be cooled as well as the optical apparatus 4 and the support member 5.
Configuration of Optical Apparatus The optical apparatus 4 forms and projects an image according to image information under the control of the controller described above. The optical apparatus 4 includes a light source apparatus 41, a uniform illumination apparatus 42, a color separation apparatus 43, a relay apparatus 44, an electro-optical apparatus 45, a projection optical apparatus 46, and an optical part enclosure 47, which accommodates the apparatus 42 to 45 therein, as shown in FIG. 2.

The light source apparatus 41 outputs a light flux to the uniform illumination apparatus 42. The light source apparatus 41 has a light source lamp 411, a reflector 412, a parallelizing lens 413, and a housing 414, which accommodates these components therein.

The uniform illumination apparatus 42 makes the illuminance of the light flux outputted from the light source apparatus 41 uniform in a plane perpendicular to the central axis of the light flux. The uniform illumination apparatus 42 has a first lens array 421, a light attenuator 422, a second lens array 423, a polarization conversion element 424, and a superimposing lens 425 arranged in this order along the direction in which the light from the light source apparatus 41 travels.

The color separation apparatus 43 separates the light flux incident thereon from the uniform illumination apparatus 42 into three color light fluxes, a red (R) light flux, a green (G) light flux, and a blue (B) light flux. The color separation apparatus 43 has dichroic mirrors 431 and 432 and a reflection mirror 433.

The relay apparatus 44 is provided along the optical path of the red light flux, among the three separated color light fluxes, which has a longer the optical path than those of the other color light fluxes. The relay apparatus 44 has a light-incident-side lens 441, a relay lens 443, and reflection mirrors 442 and 444.

The electro-optical apparatus 45 modulates each of the separated color light fluxes in accordance with image information and then combines the color light fluxes with one another. The electro-optical apparatus 45 has field lenses 451 and light-incident-side polarizers 452, which are provided on a color light flux basis, and an image formation apparatus 450.

The image formation apparatus 450 has liquid crystal panels 453 as light modulators (reference characters 453R, 453G, and 453B denote liquid crystal panels for red, green, and blue, respectively) and light-exiting-side polarizers 454, which are provided on a color light flux basis, and a light combining optical apparatus 455, which combines the modulated color light fluxes with one another to form a projection image, and the components that form the image formation apparatus 450 are integrated with one another to form a unit.

Among the components in the image formation apparatus 450, each of the liquid crystal panels 453 is a transmissive liquid crystal panel, which has a light incident surface and a light exiting surface separate from each other, in the present embodiment.

The light combining optical apparatus 455 has a cross dichroic prism (hereinafter abbreviated to prism in some cases) 456, a light blocking plate 457 (see FIGS. 4 and 8), which is attached to the light-exiting-side surface of the prism 456, and an optical filter 458 (see FIGS. 4 and 8), which is held by the light blocking plate 457. The light blocking plate 457 and the optical filter 458 will be described later in detail.

The prism 456 is formed of four rectangular prisms so bonded to each other that the bonded prisms have a roughly square shape in a plan view, and the prism 456 has three light incident surfaces on which the light fluxes modulated by the liquid crystal panels 453 and a light exiting surface through which the combined light exits. The prism 456 has two dielectric multilayer films formed on the interfaces between the four rectangular prisms, and the two dielectric multilayer films combine the color light fluxes modulated by the corresponding liquid crystal panels 453 with one another.

Figure 3:
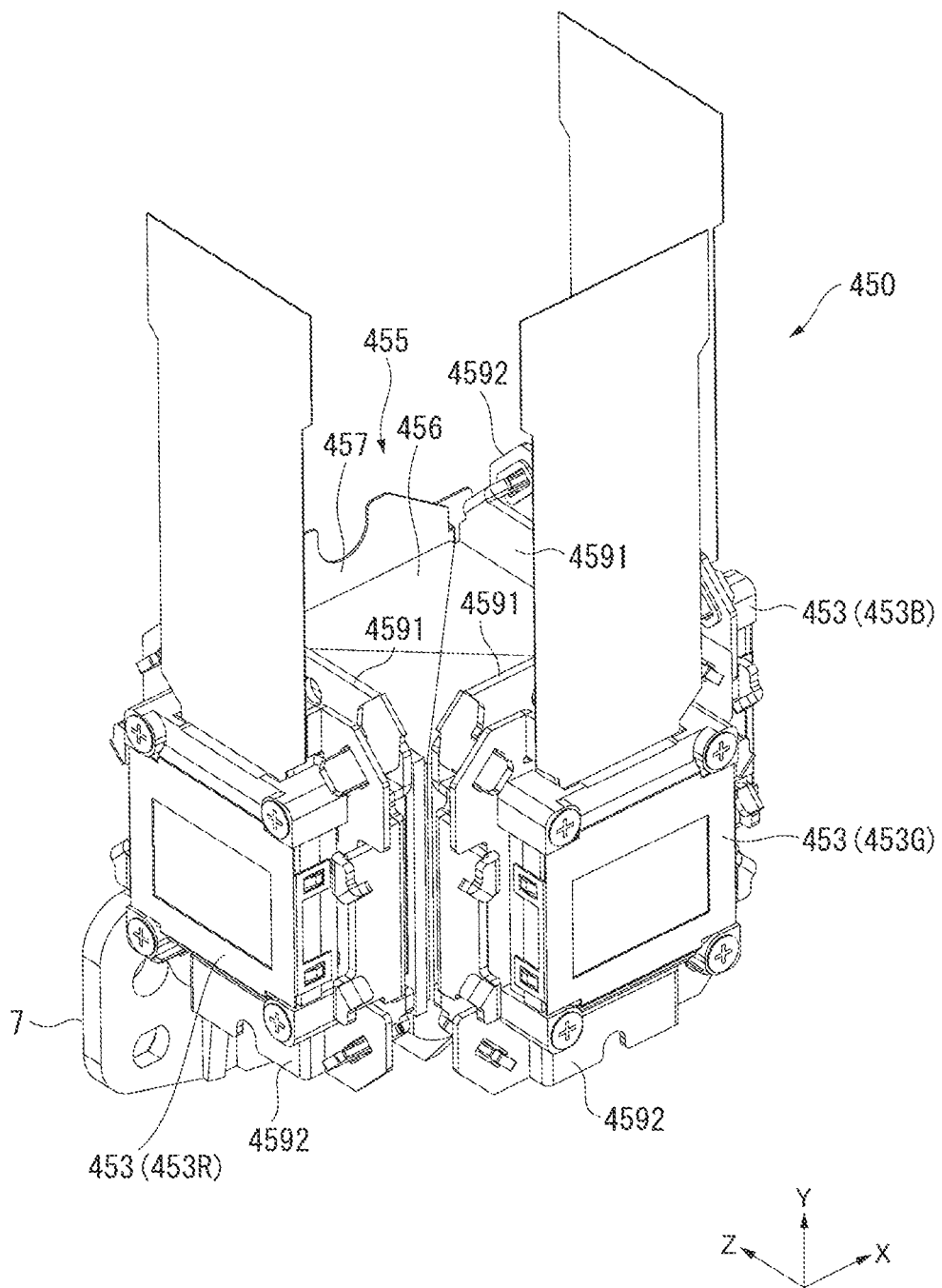
FIG. 3 is a perspective view showing an image formation apparatus in the first embodiment.

FIG. 3 is a perspective view showing the image formation apparatus 450.

The image formation apparatus 450 has three first holding members 4591 and three second holding members 4592, as shown in FIG. 3, as well as the components described above.

The first holding members 4591 are attached to the three light incident surfaces of the prism 456 described above. Each of the first holding members 4591 is formed by bending a sheet metal and has an opening which is located roughly at the center of the first holding member and through which light to be incident on the corresponding one of the light incident surfaces passes, although not illustrated in detail in FIG. 3. The light-exiting-side polarizers 454 described above are then so attached to the first holding members 4591 that the openings are blocked.

Each of the second holding members 4592 holds the corresponding liquid crystal panel 453 described above and is attached to the corresponding first holding member 4591. The second holding member 4592 has an opening (not shown) through which the light modulated by the liquid crystal panel 453 passes. The light having passed through the opening and further passed through the light-exiting-side polarizer is incident via the opening formed in the first holding member 4591 on the light incident surface described above. The color light fluxes thus incident on the light incident surfaces are combined with one another in the prism 456, and the combined light exits through a light exiting surface 4551 (see FIG. 4) of the light combining optical apparatus 455 described above toward the projection optical apparatus 46.

The second holding members 4592 are attached to the first holding members 4591 with a predetermined space therebetween. That is, a channel through which air delivered from the cooler described above flows is formed between the first holding members 4591 and the second holding members 4592. The air flowing through the channel cools the liquid crystal panels 453 and the light-exiting-side polarizers 454.

Referring back to FIG. 2, the projection optical apparatus 46 enlarges and projects a formed projection image on the projection surface described above. The projection optical apparatus 46 is configured as an assembled lens including a projection lens 461 (see FIGS. 4 to 7) and a lens barrel 462, which accommodates the projection lens 461 therein. The projection lens 461 is formed of a plurality of lenses including a focus lens and a zoom lens. The thus configured projection optical apparatus 46 is supported by a lens barrel support member 6, which forms the support member 5, which will be described later.

The optical part enclosure 47, although not illustrated in detail, has a part accommodation member that accommodates the optical parts that form the apparatus 42 to 44 described above and a lid member that blocks an opening which is formed in the part accommodation member and through which the parts are accommodated. The optical part enclosure 47 has an illumination optical axis Ax set therein, and the apparatus 42 to 44 described above are disposed in predetermined positions along the illumination optical axis Ax, and the light source apparatus 41, the electro-optical apparatus 45, and the projection optical apparatus 46 described above are disposed with reference to the illumination optical axis Ax.

Configuration of Support Member

Figure 4:
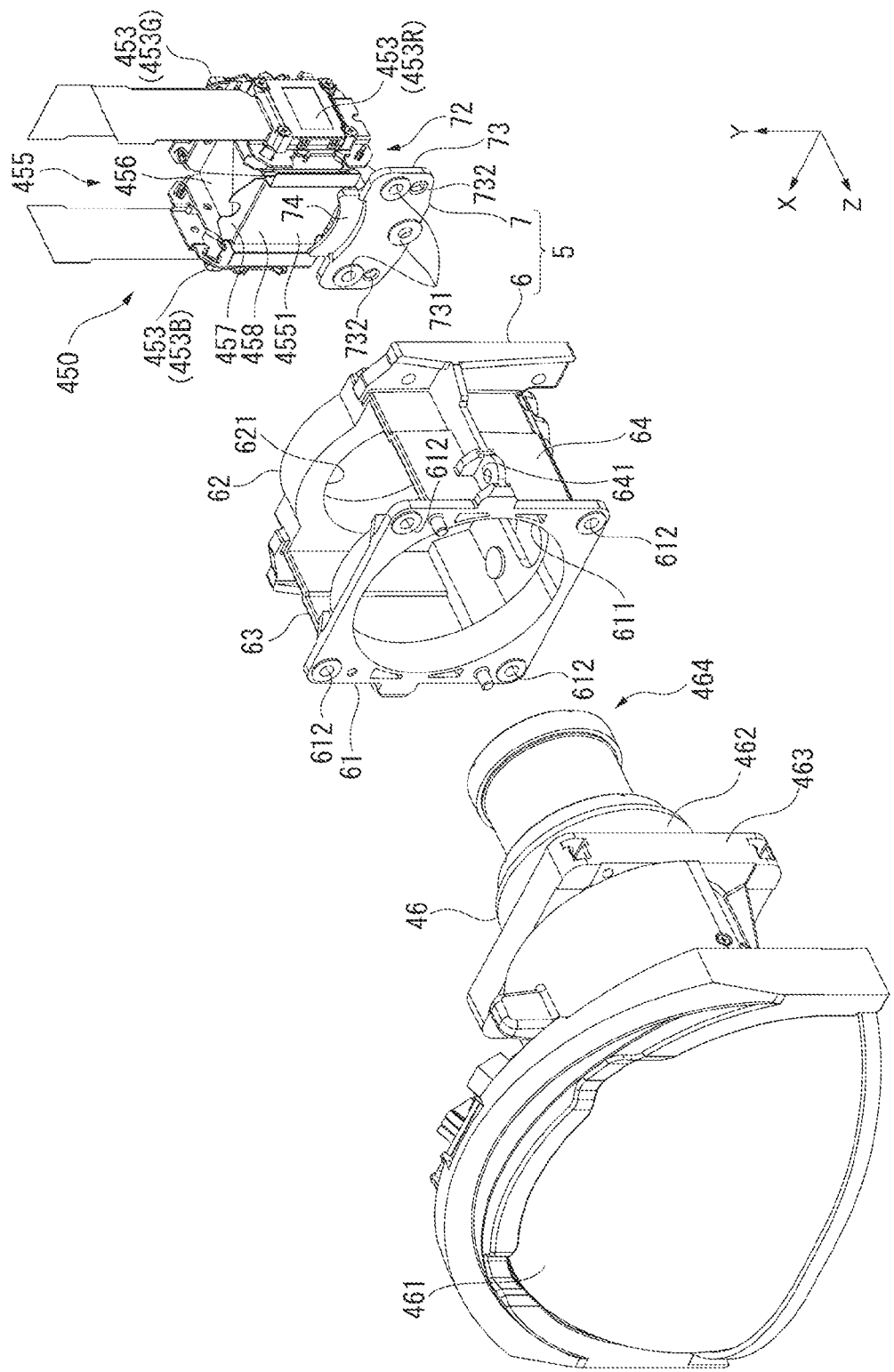
FIG. 4 is a perspective view of a support member in the first embodiment viewed from the light exiting side.
Figure 5:
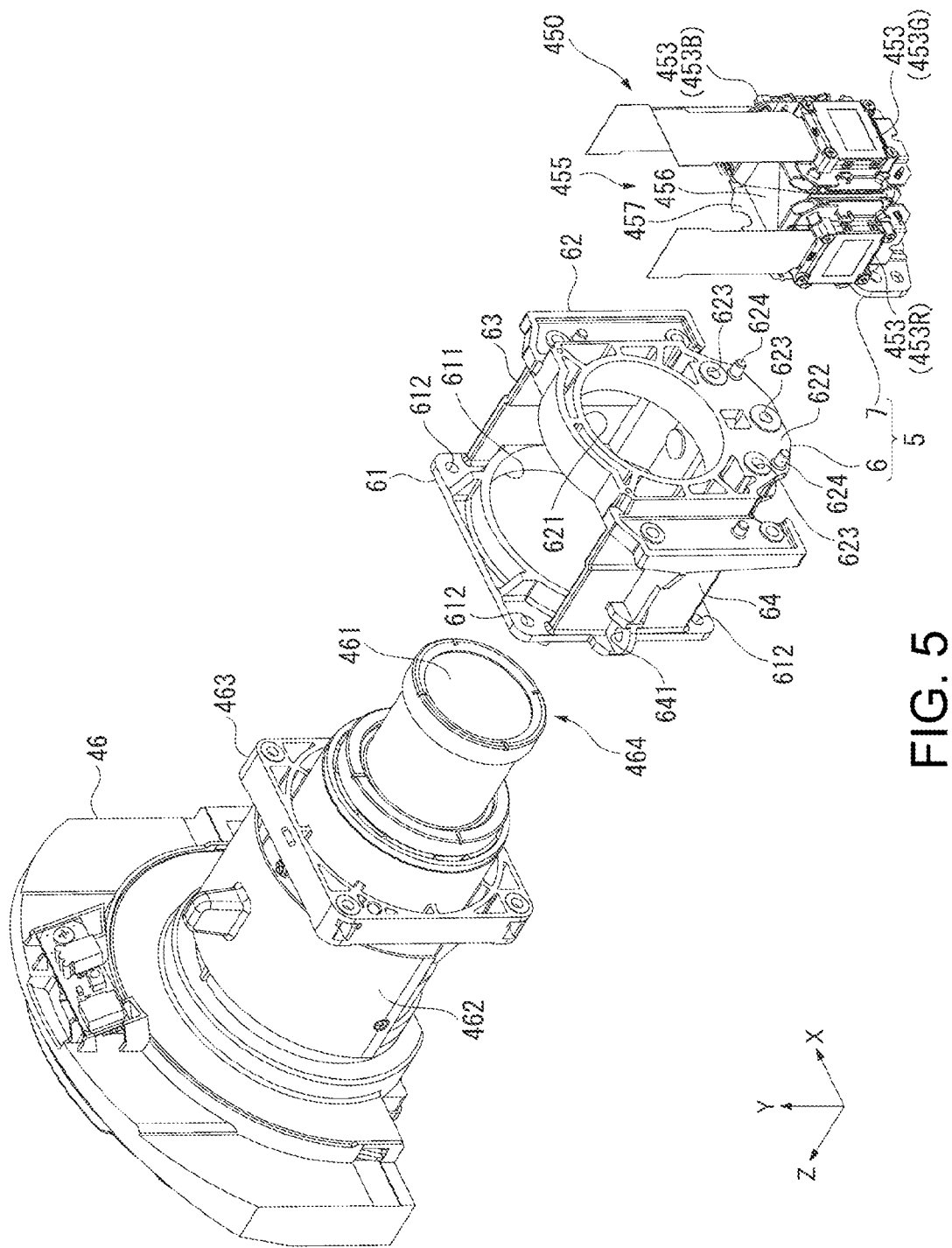
FIG. 5 is a perspective view of the support member in the first embodiment viewed from the light incident side.

FIGS. 4 and 5 are perspective views of the support member 5 viewed from the light exiting side and the light incident side, respectively. FIGS. 4 and 5 shows the image formation apparatus 450 and the projection optical apparatus 46 supported by the support member 5.

The support member 5 supports the image formation apparatus 450 and the projection optical apparatus 46 described above and integrates them with each other. The support member 5 has a lens barrel support member 6 and an apparatus support member 7, as shown in FIGS. 4 and 5.

In the following description, it is assumed that a Z direction is the direction extending along a central axis A1 (see FIG. 6) of the lens barrel 462 described above and oriented in the direction in which the projection optical apparatus 46 projects an image (the Z direction is the direction from the rear surface portion 2D toward the front surface portion 2C), and that X and Y directions are directions perpendicular to the Z direction and to each other. In the present embodiment, it is assumed that the Y direction is the direction from below to above in a case where the projector 1 is so installed that the bottom surface portion 2B described above faces a predetermined install surface and the Z direction coincides with the horizontal direction (the Y direction is the direction from the bottom surface portion 2B toward the top surface portion 2A), and that the X direction is the direction from right to left in a case where the projector is viewed from the Z direction side (the X direction is the direction from the right side surface portion 2F toward the left side surface portion 2E).

Configuration of Lens Barrel Support Member

The lens barrel support member 6 supports the lens barrel 462, is made of a metal, and is formed in a roughly tubular shape into which the lens barrel 462 is inserted. The lens barrel support member 6 has a pair of support portions 61 and 62, which extend along XY planes, and a pair of connection portions 63 and 64, which connect X-direction end portions of the support portions 61 and 62 to each other. The support portion 61 is located on the Z-direction side of the support portion 62, and the connection portion 63 is located on the X-direction side of the connection portion 64.

The support portion 61 is formed in a roughly rectangular shape when viewed from the Z-direction side. The support portion 61 has a roughly circular opening 611 formed roughly at the center thereof, and the opening 611 has an inner diameter according to the outer circumferential edge of the lens barrel 462. Further, the support portion 61 has holes 612 formed at four corner portions, and the holes 612 pass through the support portion 61 in the Z direction. Screws (not shown) to be threaded into a flange 463, which is formed as part of the lens barrel 462, are inserted through the holes 612.

The support portion 62 is formed in a roughly rectangular shape when viewed from the side opposite the Z-direction side, as shown in FIG. 4. The support portion 62 has an opening 621 formed roughly at the center thereof, and the opening 621 has an inner diameter according to the outer edge shape of an end portion of the lens barrel 462 on the side opposite the Z-direction side. The lens barrel 462 is so shaped that the outer diameter of the end portion on the side opposite the Z-direction side is smaller than the outer diameter of a roughly central portion, and the inner diameter of the opening 621 is therefore smaller than the inner diameter of the opening 611 described above.

The end portion of the lens barrel 462 on the side opposite the Z-direction side is inserted into the openings 611 and 621, and the screws inserted through the holes 612 are threaded into the flange 463 with the support portion 61 in contact with the flange 463, whereby the lens barrel 462 is fixed to the lens barrel support member 6.

A roughly central portion of the support portion 62 in the X direction protrudes in the direction opposite the Y direction, and the protruding portion forms an attaching portion 622, to which the apparatus support member 7, which will be described later, is attached, as shown in FIG. 5. The attaching portion 622 has a plurality of threaded holes 623 (three threaded holes 623 in the present embodiment), into which screws (not shown) inserted through the apparatus support member 7 are threaded, and a plurality of positioning pins 624 (two positioning pins 624 in the present embodiment), which position the apparatus support member 7.

The connection portions 63 and 64 have holes 641 (the hole formed in the connection portion 63 is not shown) formed therein, and screws that fix the lens barrel support member 6 to the inner surface of the lower case 22 described above the holes 641 are inserted through the holes 641.

Configuration of Apparatus Support Member

Figure 6:
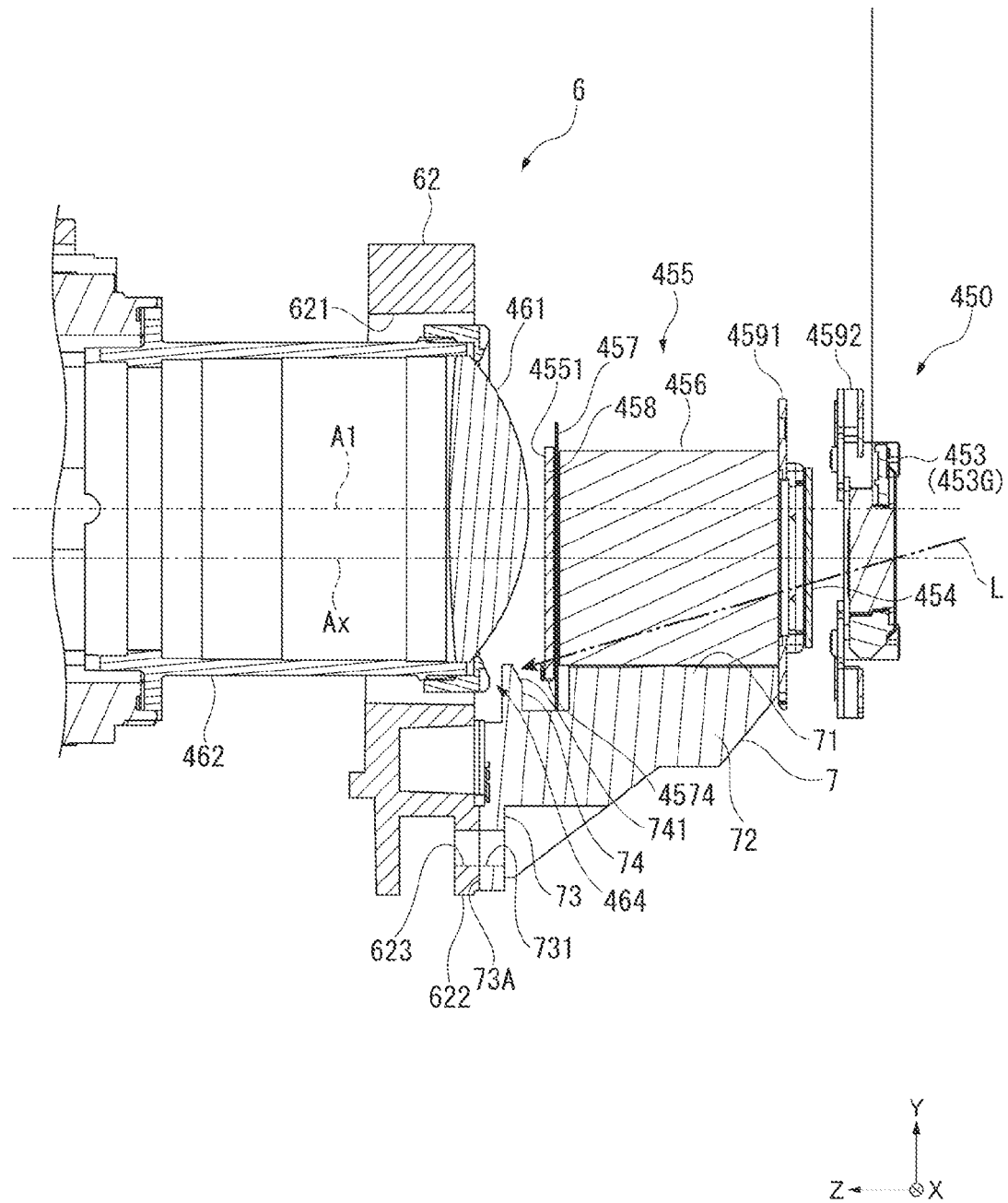
FIG. 6 is a cross-sectional view of a lens barrel support member and an apparatus support member in the first embodiment.
Figure 7:
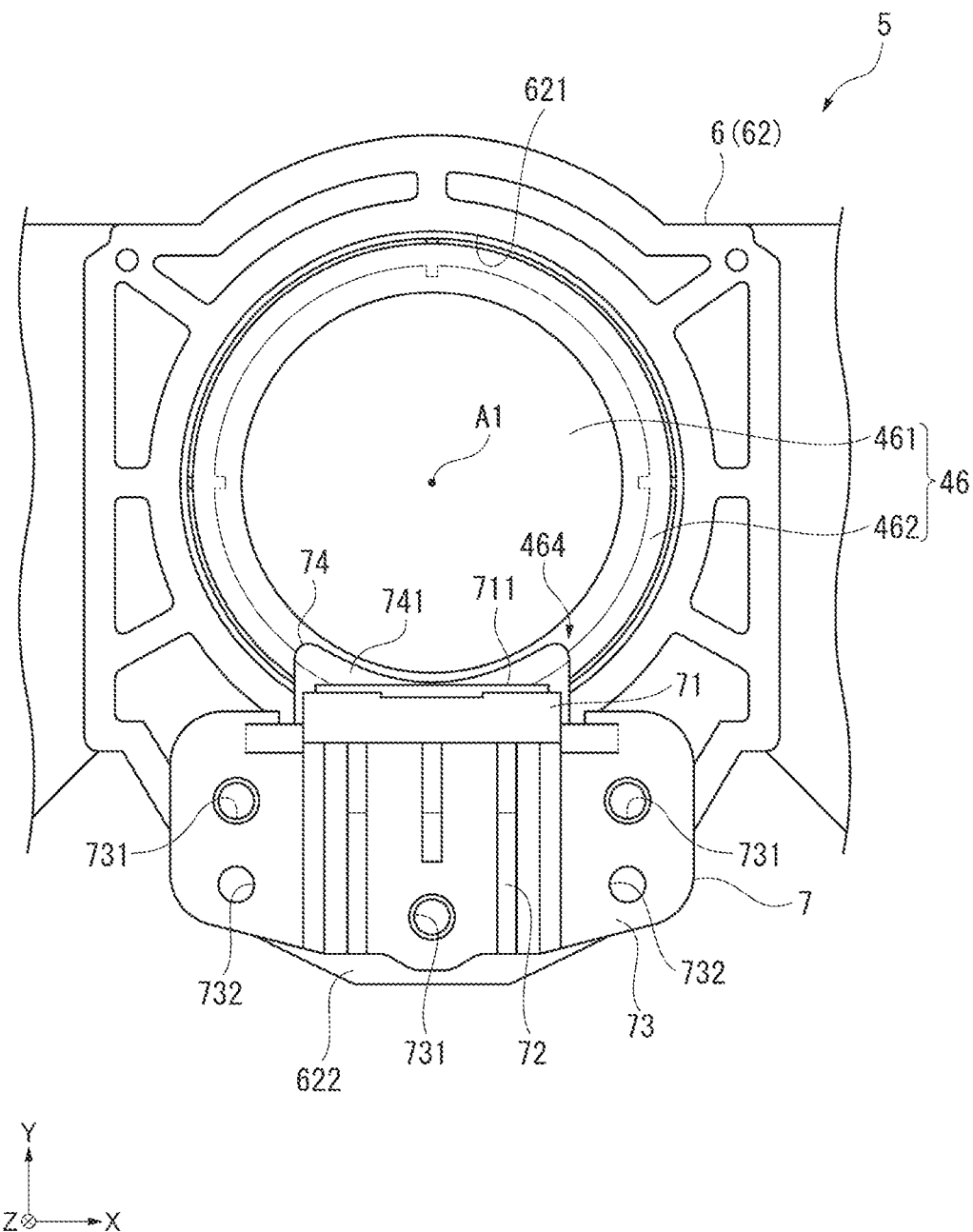
FIG. 7 is a view of the apparatus support member in the first embodiment viewed from the light incident side.

FIG. 6 is a cross-sectional view taken along an YZ plane and showing the lens barrel support member 6 supporting the lens barrel 462 and the apparatus support member 7 supporting the image formation apparatus 450. FIG. 7 is a view of the apparatus support member 7 attached to the support portion 62 of the lens barrel support member 6 viewed from the light incident side (from the side opposite the Z-direction side).

The apparatus support member 7 supports the image formation apparatus 450 and is fixed to the attaching portion 622 described above. The apparatus support member 7 is a unitary molded part made of a synthetic resin in the present embodiment and has a fixing portion 71, an extending portion 72, an attaching portion 73, and a light blocking portion 74, as shown in FIGS. 6 and 7.

The fixing portion 71 is a portion on which the image formation apparatus 450 (prism 456) described above is mounted and to which it is fixed. Further, the fixing portion 71 is a portion extending along an XZ plane when the apparatus support member 7 is attached to the lens barrel support member 6 described above and is formed in a roughly rectangular shape when viewed from the Y-direction side. The fixing portion 71 has a swelling portion 711 formed roughly at the center thereof, and the swelling portion 711 swells toward the Y-direction side, as shown in FIG. 7. The prism 456 is mounted on the swelling portion 711, adjusted in terms of position, and then fixed with an adhesive.

The extending portion 72 is a portion that extends from the fixing portion 71 in the Z direction, as shown in FIG. 6. The extending portion 72 connects the fixing portion 71 to the attaching portion 73.

The attaching portion 73 is a portion that faces the attaching portion 622 described above and is fixed to the support portion 62 described above (that is, lens barrel support member 6) with screws (not shown). The attaching portion 73 has an attaching surface 73A, which comes into contact with the attaching portion 622 and extends along an XY plane.

The attaching portion 73 has three holes 731, through which screws (not shown) to be threaded into the threaded holes 623 described above are inserted along the Z direction, and two holes 732, into which the positioning pins 624 described above are inserted, as shown in FIGS. 4 and 7.

The light blocking portion 74 is a portion that protrudes in the Y direction from a Y-direction-side end portion of the attaching portion 73. Specifically, the light blocking portion 74 covers a blocked portion 464 of the lens barrel 462 on the side opposite the Y-direction side when viewed from the side opposite the Z-direction side (the side where the image formation apparatus 450 is present) and blocks light incident on the blocked portion 464 when the apparatus support member 7 is attached to the lens barrel support member 6 supporting the lens barrel 462. The light blocking portion 74 is formed in an arcuate shape along the blocked portion 464 of the lens barrel 462 when viewed from the side opposite the Z-direction side, as shown in FIGS. 4 and 7.

The thus configured light blocking portion 74 has an inclined surface 741 formed on the side opposite the Z-direction side and inclined with respect to the Z direction, as shown in FIGS. 6 and 7.

In detail, the inclined surface 741 is so inclined that it protrudes in the direction in which it approaches the central axis A1 of the lens barrel 462 with distance in the Z direction, which is the direction in which the projection lens 461 projects an image, as shown in FIG. 6. Light incident on the inclined surface 741 is reflected off the inclined surface 741, which is not allowed to enter the projection lens 461 in the lens barrel 462.

Configurations of Light Blocking Plate and Optical Filter

Figure 8:
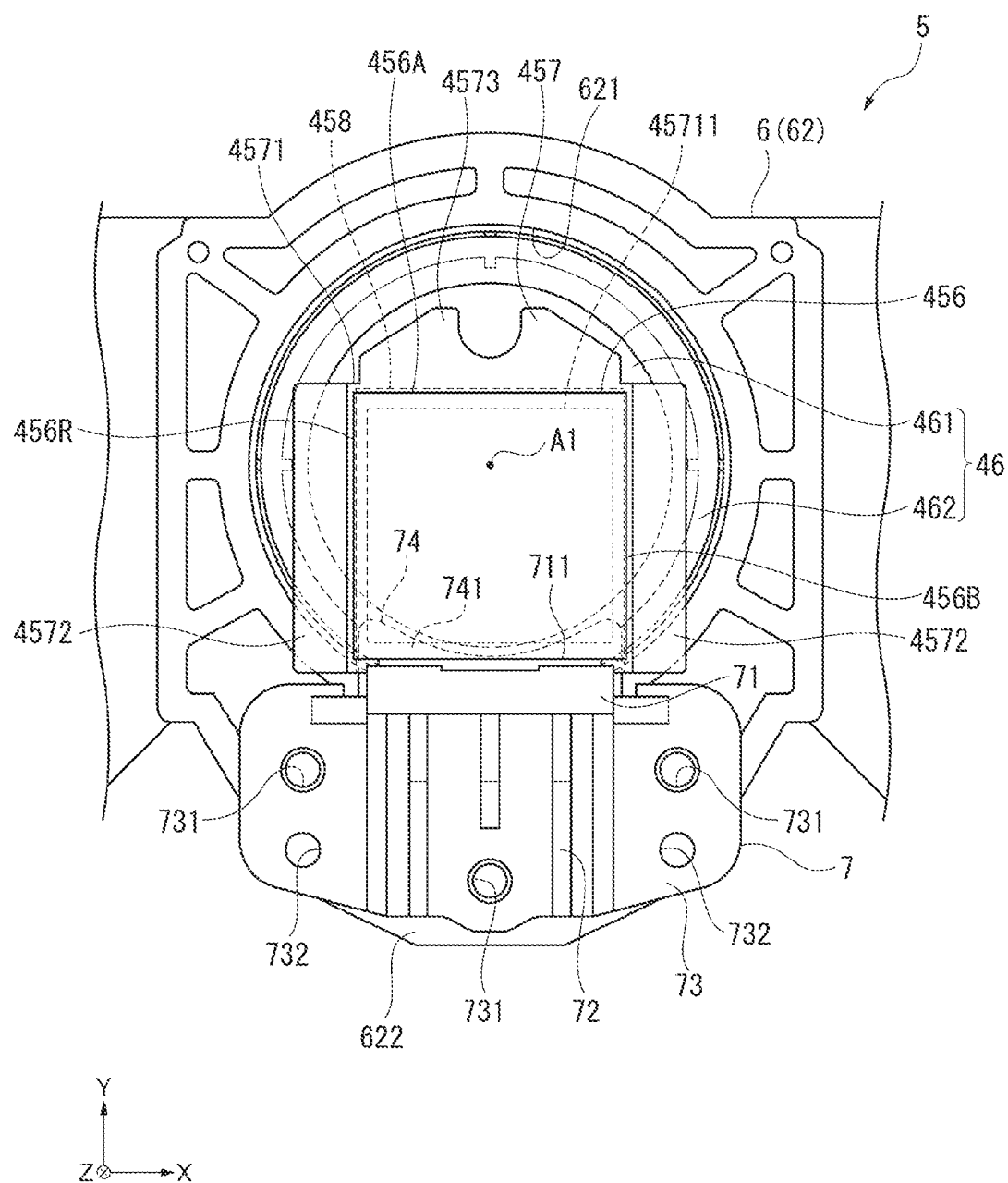
FIG. 8 is a view of a light blocking plate and an optical filter in the first embodiment viewed from the light incident side.

FIG. 8 is a view of the light combining optical apparatus 455 supported by the apparatus support member 7 and the projection optical apparatus 46 viewed from the side opposite the Z-direction side.

The light blocking plate 457 and the optical filter 458, which form the light combining optical apparatus 455 described above, will now be described.

The light blocking plate 457 is a plate-shaped member made of a metal and disposed on the light-exiting-side surface of the prism 456 (Z-direction-side surface), as shown in FIG. 6. The light blocking plate 457 blocks at least part of unnecessary light other than the combined light (image forming light) having undergone the combining process in the prism. 456 to prevent the unnecessary light from entering the projection lens 461. Further, the light blocking plate 457 holds the optical filter 458 in the optical path of the combined light having undergone the combining process in the prism 456 and exited out of the prism 456.

The thus configured light blocking plate 457 has, as shown in FIGS. 6 and 8, an attaching portion 4571 (see FIG. 8), bent portions 4572 (see FIG. 8), an extending portion 4573 (see FIG. 8), and a holding portion 4574 (see FIG. 6).

The attaching portion 4571 is formed in a frame-like shape having an opening 45711, which allows the light having exited out of the prism 456 described above to pass through, as shown in FIG. 8.

The bent portions 4572 are formed of a pair of bent portions provided on opposite sides of the attaching portion 4571 in the X direction and block at least part of the light traveling in the Z direction along a light incident surface 456B of the prism 456, on which the blue light is incident, and a light incident surface 456R of the prism 456, on which the red light is incident, as shown in FIG. 8. That is, one of the pair of bent portions 4572 blocks light passing through the space between the liquid crystal panel 453B and the corresponding light-exiting-side polarizer 454 and the space between the light-exiting-side polarizer 454 and the light incident surface 456B, and the other bent portion 4572 blocks light passing through the space between the liquid crystal panel 453R and the corresponding light-exiting-side polarizer 454 and the space between the light-exiting-side polarizer 454 and the light incident surface 456R.

The pair of thus configured bent portions 4572 extend in the Z direction from the sides of the attaching portion 4571 that extend in the Y direction and is then bent outward in the X direction away from the attachment portion 4571. The pair of bent portions 4572 are located outside the light exiting surface 4551 in the X direction and outside the light blocking portion 74 in the X direction when viewed from the side opposite the Z-direction side.

The pair of bent portions 4572 overlap with at least part of a region located on the light incident side of the projection optical apparatus 46 and outside the light blocking portion 74 in the X direction (that is, region that is not covered with light blocking portion 74).

As shown in FIG. 8, the pair of bent portions 4572 sandwich the optical filter 458 from the opposite sides thereof in the X direction to position the optical filter 458 in the X direction.

The extending portion 4573 extends in the Y direction from the attaching portion 4571 and covers at least part of a region on the light incident side of the projection optical apparatus 46 and on the Y-direction side of the prism 456, as shown in FIG. 8. The extending portion 4573 blocks at least part of the light traveling in the Z direction along a Y-direction-side surface 456A of the prism 456.

The holding portion 4574 holds the optical filter 458 in a position between the prism 456 and the projection lens 461 and in the optical path of the light having exited out of the prism 456 (image forming light), as shown in FIG. 6. The holding portion 4574 protrudes in the form of a hook in a position on the side opposite the Y-direction side on the Z-direction-side surface of the attaching portion 4571 (in a position on the opposite side of the opening 45711 to the Y-direction side) and supports an end portion of the optical filter 458 on the side opposite the Y-direction side.

The optical filter 458 is a rectangular optical member and is, for example, a color selection filter that rotates the polarization state of light that belongs to a wavelength region classified into green by 90° (converts P-polarized light into S-polarized light, for example). The light having exited out of the optical filter 458 is incident on the projection lens 461, which faces the optical filter 458. That is, the light exiting surface of the optical filter 458 forms the light exiting surface 4551 of the light combining optical apparatus 455.

Light Blocked by Light Blocking Portion of Apparatus Support Member and Light Blocking Plate In the optical apparatus 4 described above, which includes a plurality of mirrors, a light attenuator, and other reflection members, light that is not used for image formation forms stray light. When the stray light is incident on the lens barrel 462, the lens barrel 462 is heated and hence distorted in some cases. In this case, the projection lens 461 accommodated in the lens barrel 462 shifts in terms of position, resulting in defocus of a projected image.

To avoid the situation described above, the bent portions 4572 of the light blocking plate 457 are disposed in a position on the Z-direction side of the image formation apparatus 450 but on the opposite side of the lens barrel 462 to the Z-direction side. The bent portions 4572 block at least part of stray light traveling in the Z direction along the light incident surfaces 456B and 456R of the prism 456. The stray light is therefore not allowed to be incident on the end of the lens barrel 462 on the side opposite the Z-direction side. Since the stray light therefore does not heat the lens barrel 462, distortion of the lens barrel 462 or shift in the position of the projection lens 461 does not occur, whereby no defocus of a projected image occurs.

In addition to the bent portions 4572, the extending portion 4573 described above prevents the stray light from entering the projection lens 461, whereby an image projected by the projection optical apparatus 46 is not degraded.

Further, the light blocking portion 74, which is formed as part of the apparatus support member 7 and blocks light incident on the lens barrel 462, is provided in a position between the image formation apparatus 450 and the lens barrel 462 and between the pair of bent portions 4572 when viewed from the side opposite the Z-direction side. That is, the light blocking portion 74, which covers the above-mentioned blocked portion 464 of the lens barrel 462, is located on the light incident side of the lens barrel 462.

The thus configured light blocking portion 74 can block stray light to be incident on the blocked portion 464 (for example, stray light L, which passes through the light exiting surface 4551 but is not blocked by the light blocking plate 457, as indicated by the chain double-dashed line with an arrow shown in FIG. 6). Since the stray light L therefore does not heat the blocked portion 464, distortion of the lens barrel 462 or shift in the position of the projection lens 461 does not occur, whereby no defocus of a projected image occurs.

The blocked portion 464, which is covered by the light blocking portion 74 when viewed from the side opposite the Z-direction side, is not only an end portion of the lens barrel 462 on the side opposite the Z-direction side but also part of the end portion on the side opposite the Y-direction side.

The central axis of an image incident on the projection lens 461 (that is, illumination optical axis Ax) is shifted toward the side opposite the Y-direction side from the central axis A1 of the lens barrel 462 (which coincides with the optical axis of the projection lens 461), as shown in FIG. 6. This arrangement tends to cause the stray light described above as well as the light that forms the image to be incident on a portion of the projection lens 461 on the side opposite the Y-direction side. Therefore, the light blocking portion 74, which is located on the side opposite the Y-direction side and covers the blocked portion 464, on which the stray light described above tends to be incident, can effectively prevent the defocus described above even when the light blocking portion 74 is relatively small.

On the other hand, a relatively broad space is formed on the light incident side of the Y-direction-side end portion of the lens barrel 462 and end portions thereof on the opposite sides in the X direction, as shown in FIG. 6, and air that cools the image formation apparatus 450 flows through the space. As a result, the air suppresses an increase in temperature of each of the end portions, which essentially receives a small amount of stray light incident thereon. The light blocking portion 74, which covers the blocked portion 464 described above, which is located on the side toward which the illumination optical axis Ax is shifted from the central axis A1 described above, can therefore suppress an increase in temperature of the blocked portion 464, which is hard to be cooled, whereby an increase in temperature of the lens barrel 462 can be reliably suppressed.

Advantageous Effects Provided by First Embodiment

The projector 1 according to the present embodiment described above provides the following advantageous effects.

The light blocking portion 74, which blocks light incident on the lens barrel 462 from the side where the image formation apparatus 450 is present, is provided in a position between the image formation apparatus 450 and the lens barrel 462.

Even when stray light is produced in the projector (optical apparatus 4), the thus provided light blocking portion 74 can prevent the stray light from being incident from the side where the image formation apparatus 450 is present on the light-incident-side end portion of the lens barrel 462 (end portion on the side opposite the Z-direction side).

Further, the light blocking portion 74, which is a member separate from the lens barrel 462, does not tend to transmit heat generated in the light blocking portion 74 to the lens barrel 462 even when light is incident on the light blocking portion 74 and heat it.

The lens barrel 462 is therefore not distorted due to the stray light incident thereon, whereby displacement of the projection lens 461 described above can be suppressed. As a result, defocus of a projected image can be avoided, and the position where an image projected by the projection lens 461 described above is not changed.

Since the light blocking portion 74 is provided as part of the support member 5, the light blocking portion 74 does not need to be separately provided, for example, by causing it to rise from the exterior enclosure 2. In addition, since the light blocking portion 74 can be reliably configured as a member separate from the lens barrel 462, heat generated in the light blocking portion 74 is reliably unlikely to be transmitted to the lens barrel 462. Distortion of the lens barrel 462 and displacement of the projection lens 461 can therefore be reliably suppressed.

When a light blocking portion having a configuration similar to that of the light blocking portion 74 is provided as part of the lens barrel support member 6 out of the lens barrel support member 6 and the apparatus support member 7, which form the support member 5, the configuration needs to extend from the lens barrel support member 6 toward the image formation apparatus 450. In this case, the configuration possibly interferes with other members, such as the prism 456 and the apparatus support member 7.

In contrast, the light blocking portion 74, which is provided as part of the apparatus support member 7, can be readily disposed in a position between the image formation apparatus 450 and the lens barrel 462 without interference with the other members. Further, since the light blocking portion 74 can be disposed in a position between the image formation apparatus 450 and the lens barrel 462 without any increase in the dimension therebetween, whereby any increase in the size of the projector 1 can be avoided.

The light blocking portion 74 is formed in an arcuate shape along the outer edge shape of the blocked portion 464 described above when the light blocking portion 74 is viewed from the side where the image formation apparatus 450 is present. The thus shaped light blocking portion 74 can prevent the stray light from entering the lens barrel 462 without blocking the light that forms the image. As described above, even when the stray light is incident on the Y-direction-side end portion of the lens barrel 462 and the end portions thereof on the opposite sides in the X-direction, the temperature of each of the end portions does not tend to increase, as described above. Providing the light blocking portion 74 in consideration of the characteristic of the blocked portion 464, the temperature of which tends to increase, can therefore effectively suppress displacement of the projection lens 461 described above even when the light blocking portion 74 has a relatively small area.

When the light incident on the light blocking portion 74 is reflected off the light blocking portion 74 and then incident on the projection lens 461, the light is also projected by the projection lens 461, possibly resulting in degradation in a projected image.

To avoid the situation described above, the light blocking portion 74, which has the inclined surface 741 described above, can reflect the light incident on the inclined surface 741 from the side where the image formation apparatus 450 is present toward the image formation apparatus 450. The inclined surface 741 can therefore prevent the stray light reflected off the light blocking portion 74 from being incident on or projected by the projection lens 461, whereby a projected image will not be degraded.

Second Embodiment

A second embodiment of the invention will be described below.

A projector according to the present embodiment has a configuration similar to that of the projector 1 described above but differs therefrom in that the light combining optical apparatus does not include the light blocking plate 457 or the optical filter 458. In the following description, portions that are the same or roughly the same as those having been already described will not be described.

Figure 9:
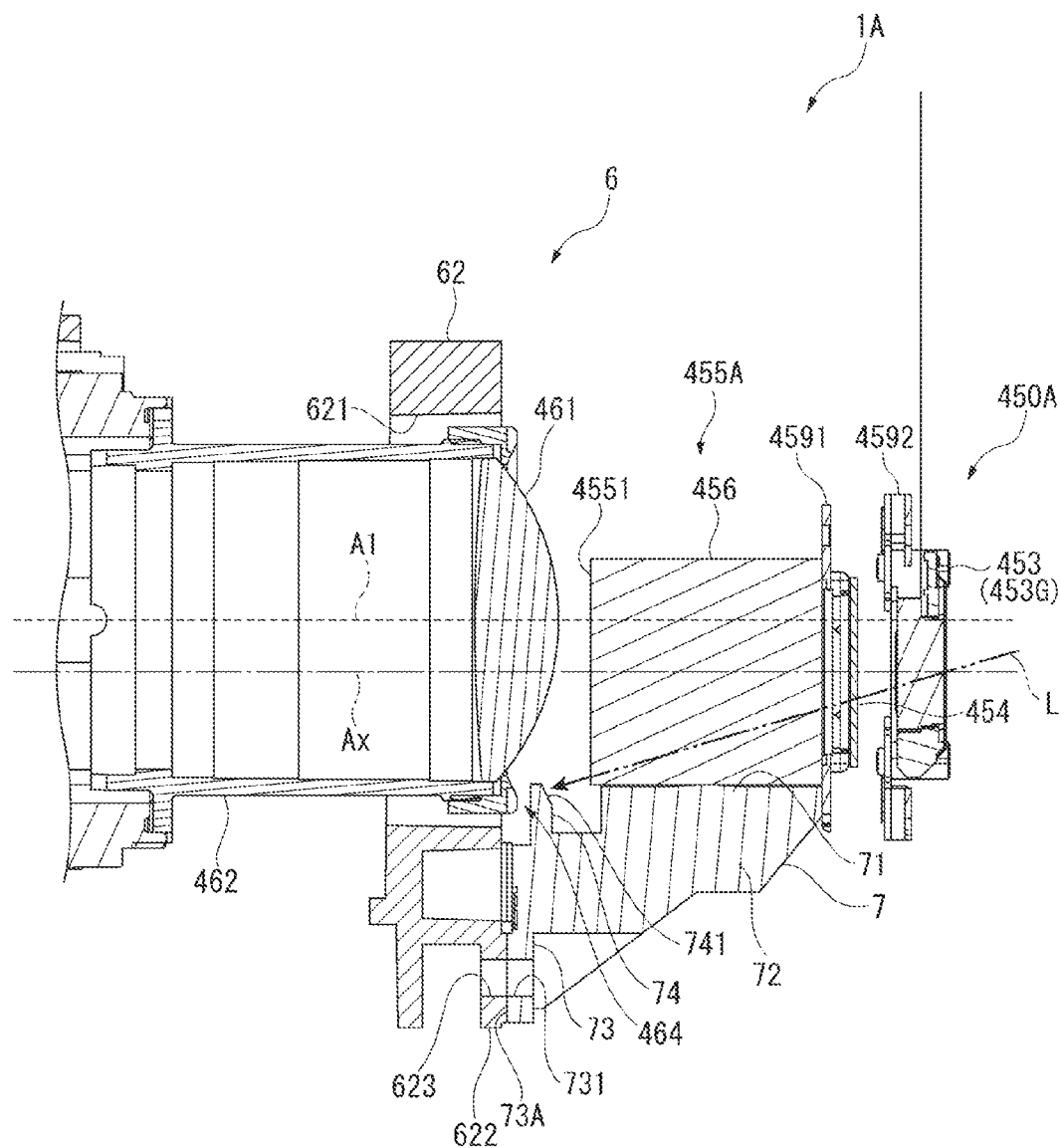
FIG. 9 is a cross-sectional view showing an image formation apparatus and an apparatus support member in a projector according to a second embodiment of the invention.

FIG. 9 is a cross-sectional view taken along a YZ plane and showing an image formation apparatus 450A, which is provided in the projector according to the present embodiment, and the apparatus support member 7, which supports the image formation apparatus 450A.

A projector 1A according to the present embodiment has the same configuration and function as those of the projector 1 described above except that the projector 1 includes an image formation apparatus 450A in place of the image formation apparatus 450, and the image formation apparatus 450A has the same configuration and function as those of the image formation apparatus 450 except that the image formation apparatus 450A has a light combining optical apparatus 455A in place of the light combining optical apparatus 455 as shown in FIG. 9.

In the present embodiment, the light combining optical apparatus 455A has the cross dichroic prism 456 supported by the apparatus support member 7 but does not have the light blocking plate 457 or the optical filter 458 described above. The light combining optical apparatus 455A combines the color light fluxes modulated by the liquid crystal panels 453 described above and incident on the light incident surfaces of the prism 456 with one another and causes the combined light (image forming light) to exit through the light exiting surface 4551 of the light combining optical apparatus 455A, which is formed of the light exiting surface of the prism 456, toward the projection lens 461.

The thus configured projector 1A according to the present embodiment can also provide the same advantageous effects as those provided by the projector 1 described above.

Variations of Embodiments

The invention is not limited to the embodiments described above, and variations, improvements, and other modifications to the extent that they can achieve the advantage of the invention fall within the scope of the invention.

In each of the embodiments described above, the image formation apparatus 450 is configured to include the three liquid crystal panels 453 (453R, 453G, and 453B), the three light-exiting-side polarizers 454, and the prism 456. The image formation apparatus, however, does not necessarily have the configuration described above. For example, the image formation apparatus may be configured to include two or less or four or more liquid crystal panels 453 and light-exiting-side polarizers, and in addition to them, the image formation apparatus may be configured to include, for example, viewing angle compensators and other optical parts.

Further, each of the light modulators to be employed is not limited to the transmissive liquid crystal panel 453 having a light incident surface and a light exiting surface separate from each other, and a reflective liquid crystal panel having a single surface that serves as both the light incident surface and the light exiting surface may be employed. Moreover, a light modulator that is not based on the liquid crystal technology, such as a device using micromirrors, for example, a DMD (digital micromirror device), or any other light modulator capable of modulating an incident light flux to form an image according to image information, may be used. In this case, the light-exiting-side polarizers 454 and the prism 456 can be omitted.

Further, the light combining optical apparatus to be employed is not limited to the cross dichroic prism described above and may have other configurations. For example, the light combining optical apparatus may be formed of a plurality of dichroic mirrors.

Further, the projection lens 461 is formed of a plurality of lenses. The invention is, however, not necessarily configured this way. That is, the projection lens 461 may be formed of a single lens.

Further, the liquid crystal panels 453 and the light-exiting-side polarizers 454 are attached to the first holding members 4591 and the second holding members 4592, which are fixed to the prism 456, so that the image formation apparatus 450 is configured as a unit. The invention is, however, not necessarily configured this way. For example, the liquid crystal panels 453 and the light-exiting-side polarizers 454 may not be held by the first holding members 4591 or the second holding members 4592, that is, may not be attached to the prism 456. In other words, the image formation apparatus 450 may not be configured as a unit.

In each of the embodiments described above, the light blocking portion 74 is provided as part of the apparatus support member 7, which forms the support member 5. The invention is, however, not necessarily configured this way. That is, the member provided with the light blocking portion 74 may be another member. For example, the light blocking portion may be provided as part of the lens barrel support member 6, which forms the support member 5, or the light blocking portion may be so configured that it extends from the inner surface of the exterior enclosure 2 and is then disposed between the image formation apparatus 450 and the lens barrel 462.

In each of the embodiments described above, the light blocking portion 74 is formed in an arcuate shape according to the outer edge shape of the blocked portion 464 described above when viewed from the side where the image formation apparatus 450 is present. The invention is, however, not necessarily configured this way. That is, the light blocking portion 74 may have any other shape that does not block an image to be incident on the projection lens 461. For example, the light blocking portion may be so configured that it is formed in a circular shape that covers the entire circumference of the light-incident-side end portion (end portion on the side opposite the Z-direction side) of the lens barrel 462 to block light to be incident on the end portion. The light blocking portion may still instead be so configured that it is formed in accordance with the outer edge shape of at least a portion of the light-incident-side end portion to block light to be incident on the portion. Still instead, the position where the light blocking portion 74 is disposed can be changed as appropriate based, for example, on the relationship between the central axis A1 of the lens barrel 462 and the illumination optical axis Ax.

In each of the embodiments described above, the light blocking portion 74 has the inclined surface 741 described above on the side facing the image formation apparatus 450. The invention is, however, not necessarily configured this way. That is, the inclined surface 741 may be omitted.

Instead, a reflection suppression layer may be formed on the surface of the light blocking portion 74 to suppress reflection of light incident thereon. Still instead, the inclined surface 741 may not be formed over the entire region of the light blocking portion 74 in the X direction but may be formed only on part of the light blocking portion 74 in the X direction. Further, the angle of the inclined surface 741 with respect to the central axis A1 and the illumination optical axis Ax described above can be changed as appropriate and may further be changed in accordance with the position on the inclined surface 741.

In each of the embodiments described above, the lens barrel 462 is fixed to the lens barrel support member 6, which is fixed in the exterior enclosure 2. The lens barrel support member 6 may include a shift mechanism that shifts the lens barrel 462 in a direction perpendicular to the illumination optical axis Ax or the central axis A1 described above. In this case, the light blocking portion 74 may be provided in accordance with the position which is within the range over which the shift mechanism shifts the lens barrel 462 and where light is incident on the lens barrel 462 by the greatest amount. Instead, the light blocking portion may be shifted along with the lens barrel 462 shifted by the shift mechanism.

The lens barrel 462 is made of a synthetic resin. The lens barrel 462 is not necessarily made of a synthetic resin and may instead be made of a metal or any other material.

In each of the embodiments described above, the apparatus support member 7 supports the surface of the prism 456 on the side in the direction from the central axis A1 toward the illumination optical axis Ax (that is, surface on the side opposite the Y-direction side). The invention is, however, not necessarily configured this way. For example, the apparatus support member 7 may support the surface of the prism 456 on the side in the direction from the illumination optical axis Ax toward the central axis A1 (that is, surface on the Y-direction side). In this case, the light blocking portion may be provided as part of the apparatus support member or may be provided as part of another member as described above.

In the first embodiment described above, the light combining optical apparatus 455 includes the light blocking plate 457 and the optical filter 458. The invention is, however, not necessarily configured this way, and the light combining optical apparatus 455 may include only one of the light blocking plate 457 and the optical filter 458.

When the light combining optical apparatus 455 includes only the light blocking plate 457, the light exiting surface of the light combining optical apparatus is formed of the light-exiting-side surface of the prism 456.

When the light combining optical apparatus includes only the optical filter 458, the optical filter 458 may be attached to the light-exiting-side surface of the prism 456 via a member that includes the attaching portion 4571 and the holding portion 4574 described above in place of the light blocking plate 457.

In the first embodiment described above, the light blocking plate 457 has a pair of bent portions 4572. The invention is, however, not necessarily configured this way, and the light blocking plate 457 may instead have only one of the pair of bent portions 4572 or may not have the bent portions 4572.

Further, in the first embodiment described above, the light blocking plate 457 has the extending portion 4573. The invention is, however, not necessarily configured this way, and the light blocking plate 457 may not have the extending portion 4573.

In each of the embodiments described above, the optical apparatus 4 is formed in a roughly L-like shape when viewed from the Y-direction side. The optical apparatus 4 does not necessarily have this shape and may instead have any other shape (roughly U-like shape, for example).

In each of the embodiments described above, the light source apparatus 41 has the light source lamp 411 and the reflector 412, which reflects the light emitted from the light source lamp 411. The invention is, however, not necessarily configured this way. That is, the light source apparatus may have an LED (light emitting diode) or any other solid-state light source. Further, the number of light source apparatus may be two or more.

In each of the embodiments described above, the projector 1, which is a front projection type in which the direction in which an image is projected substantially coincides with the direction in which the image is observed, is presented by way of example. The invention is, however, not necessarily configured this way. For example, the invention is also applicable to a rear-projection-type projector, in which the projection direction and the observation direction are opposite to each other.

The present application claim priority from Japanese Patent Applications No. 2014-145669 filed on Jul. 16, 2014, and No. 2015-010062 filed on Jan. 22, 2015, which is hereby incorporated by reference in its entirety.

What is claimed is:
1. A projector comprising:
an image formation apparatus that includes:
a plurality of light modulators that each modulate a light flux incident thereon, and
a light combining optical apparatus that combines the light fluxes modulated by the plurality of light modulators to form an image;
a lens barrel that accommodates a projection lens that projects the formed image;
a lens barrel support member that includes:
a first support portion that is provided along a plane orthogonal to a projection direction of the formed image in the lens barrel, the first support portion including a first opening,
a second support portion that is provided along another plane orthogonal to the projection direction, the second support portion being spaced apart from the first support portion in the projection direction and including a second opening, and
a connection portion that connects the first support portion and the second support portion;
an apparatus support member that includes:
a fixing portion configured to fix the image formation apparatus,
an attaching portion configured to be attached to the second support portion, and
an extending portion that connects the fixing portion and the attaching portion; and
a light blocking portion that protrudes from the attaching portion along an additional plane orthogonal to the projection direction, is located in a position between the image formation apparatus and the lens barrel, and blocks light to be incident on the lens barrel,
wherein
the lens barrel is inserted into the first opening and the second opening, and
the lens barrel support member supports the lens barrel by at least the second support portion.

2. The projector according to claim 1,
wherein the light blocking portion is formed in an arcuate shape along an outer edge shape of at least part of the lens barrel when the light blocking portion is viewed from the side where the image formation apparatus is present.

3. The projector according to claim 1,
wherein the light blocking portion has an inclined surface that is inclined toward the lens barrel in the projection direction.

* * * * *